(12) United States Patent
Phanco

(10) Patent No.: US 10,760,721 B1
(45) Date of Patent: Sep. 1, 2020

(54) SWIVEL FITTING ADAPTOR AND ASSEMBLY

(71) Applicant: Hydro-Gear Limited Partnership, Sullivan, IL (US)

(72) Inventor: Eric S. Phanco, Plainfield, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 101 days.

(21) Appl. No.: 15/724,956

(22) Filed: Oct. 4, 2017

Related U.S. Application Data

(60) Provisional application No. 62/409,513, filed on Oct. 18, 2016.

(51) Int. Cl.
*F16L 17/02* (2006.01)
*F16L 27/08* (2006.01)

(52) U.S. Cl.
CPC .............. *F16L 27/0804* (2013.01)

(58) Field of Classification Search
CPC .......... F16L 17/02; F16L 17/025; F16L 17/03
USPC ........ 285/338, 345, 346, 239, 213, 215, 216
See application file for complete search history.

(56) References Cited

U.S. PATENT DOCUMENTS

| | | | | |
|---|---|---|---|---|
| 341,444 A | * | 5/1886 | Bray | F16L 17/025 277/607 |
| 470,531 A | * | 3/1892 | Aims, Jr. | F16L 37/144 285/305 |
| 2,314,315 A | * | 3/1943 | Scheele | E03C 1/22 285/213 |
| 2,343,774 A | * | 3/1944 | Klein | E03C 1/086 285/338 |
| 2,670,976 A | * | 3/1954 | Owen | F16L 5/10 277/606 |
| 2,812,958 A | | 11/1957 | Rogers | |
| 2,897,533 A | * | 8/1959 | Bull | F16J 15/025 16/2.1 |
| 3,112,939 A | | 12/1963 | Graham | |
| 3,677,578 A | * | 7/1972 | Roos | F16L 41/10 137/15.17 |
| 3,879,069 A | * | 4/1975 | Oostenbrink | F16L 41/088 285/140.1 |
| 3,913,928 A | * | 10/1975 | Yamaguchi | F16L 17/025 277/604 |
| 4,232,421 A | * | 11/1980 | Tucker | F16L 37/008 123/557 |
| 4,580,816 A | | 4/1986 | Campbell et al. | |
| 5,104,151 A | * | 4/1992 | Adams | F16L 15/08 285/148.19 |
| 5,131,408 A | | 7/1992 | Smith | |

(Continued)

FOREIGN PATENT DOCUMENTS

WO WO2002029300 4/2002

OTHER PUBLICATIONS

U.S. Appl. No. 15/724,772, filed Oct. 4, 2017, 15 pp.

*Primary Examiner* — David Bochna
(74) *Attorney, Agent, or Firm* — Neal, Gerber & Eisenberg LLP

(57) ABSTRACT

An elastomeric press-in-place swivel fitting adaptor and a swivel fitting assembly using the adaptor are disclosed herein. The swivel fitting assembly includes retention and sealing features that allow it to be installed in a threaded port by hand. It is suitable for use in a variety of low pressure fluid passage and venting applications.

18 Claims, 5 Drawing Sheets

(56) References Cited

U.S. PATENT DOCUMENTS

| | | | | |
|---|---|---|---|---|
| 5,474,337 | A | * | 12/1995 | Nepsund ................. F16L 21/03 285/345 |
| 5,692,858 | A | * | 12/1997 | Vaughan ................. E02B 13/00 239/542 |
| 5,881,840 | A | | 3/1999 | Mize |
| 6,273,478 | B1 | | 8/2001 | Benett et al. |
| 6,557,825 | B2 | * | 5/2003 | Stone ..................... F16J 15/064 251/152 |
| 6,808,181 | B1 | * | 10/2004 | Shemtov ............ F16L 19/0218 277/606 |
| 6,854,771 | B1 | | 2/2005 | Olson |
| 6,883,538 | B2 | * | 4/2005 | Toyokawa ............ F16L 41/088 123/574 |
| 7,550,689 | B2 | * | 6/2009 | Wech ..................... G01F 23/74 200/61.2 |
| 7,681,927 | B2 | | 3/2010 | Olson |
| 7,918,486 | B2 | * | 4/2011 | Preisendorfer ....... F16L 41/088 285/136.1 |
| 7,988,203 | B2 | * | 8/2011 | Martin ................. F16L 41/088 285/109 |
| 8,020,896 | B2 | * | 9/2011 | Ehrmann ................. F16L 5/14 285/124.4 |
| 8,096,587 | B2 | * | 1/2012 | Ibarra Romero ..... F16L 41/088 137/514 |
| 9,592,373 | B2 | | 3/2017 | Nguyen et al. |
| 2013/0171869 | A1 | | 7/2013 | Chastain et al. |

\* cited by examiner

SWIVEL FITTING ADAPTOR AND ASSEMBLY

CROSS-REFERENCE TO RELATED APPLICATIONS

This application claims priority to U.S. Provisional Patent Application Ser. No. 62/409,513, filed on Oct. 18, 2016, the entire disclosure of which is incorporated by reference herein.

BACKGROUND OF THE INVENTION

This application relates to swivel fittings in general, and in particular to swivel fittings suitable for use in low pressure fluid passage and venting applications, such use including attachment of a tube to a hydrostatic drive unit of a vehicle or other powered equipment. Such a tube is often connected to an external tank or vent fitting.

Various mechanisms exist to adapt a fitting to a port. Some of the mechanisms have swivel capability once installed. One such design uses a jam nut of the fitting to tighten a sealing plate against the port. The jam nut design allows an installer to rotate the fitting to a specific angle before tightening the jam nut. This design requires a tool for installation, is relatively expensive to manufacture, and may require more time to install than other options.

Another design includes a smooth adaptor or grommet with a barbed fitting inserted through the adaptor. The smooth adaptor is not optimized for a threaded port and, without an additional sealing mechanism, this design can leak. Another similar design uses a smooth adaptor or grommet, but in a smooth-bore port. One disadvantage of this design is insufficient retention force holding the adaptor and the inserted fitting in the port. Another disadvantage is the need for machining the port specifically for this fitting option.

The invention disclosed herein provides an elegant solution that addresses all of the aforementioned deficiencies and disadvantages.

SUMMARY OF THE INVENTION

A specialized elastomeric adaptor for receiving and retaining a conventional barbed fitting in a threaded port is disclosed herein. The adaptor and fitting can be easily installed in a threaded port (such as a vent port of a hydrostatic transaxle, for example) without the use of tools and the resultant swivel fitting can then be pivoted to align with a tube or hose. This invention is particularly useful because it provides the versatility of using a single, standard SAE port for either a threaded fitting or the press-in-place configuration described herein. For example, a threaded plug may be installed initially in a standard SAE port of a drive unit to avoid damage to a tube fitting or prevent fluid leakage from the drive unit during shipment. Then, a vehicle manufacturer, for example, can remove the shipping plug, push the low-cost adaptor into the SAE port, push a barbed fitting into the adaptor, and swivel the fitting into alignment with a tube and attach the tube to the fitting. The vehicle manufacturer also has the option to install a standard SAE fitting either temporarily or finally as warranted by the specific application and manufacturing process.

It should be noted that the principles taught herein can be applied to various types of fittings, such as vent fittings, for example, and not just the illustrated tube or hose fitting.

A better understanding of the properties of the invention will be obtained from the following detailed description and accompanying drawings which set forth an illustrative embodiment that is indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the inventions to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Figure 3:
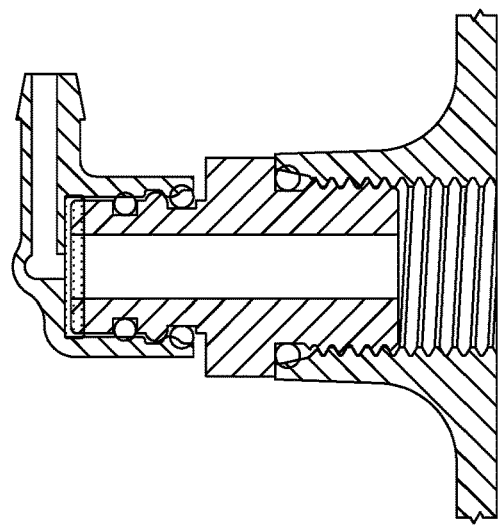
FIG. 3 depicts another prior art swivel fitting for a threaded SAE port.
Figure 2:
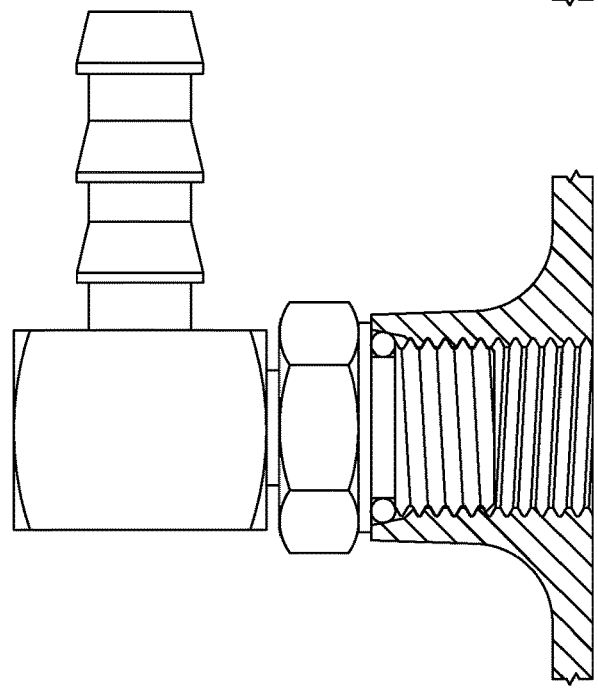
FIG. 2 depicts a prior art swivel fitting with jam nut for an SAE port.
Figure 1:
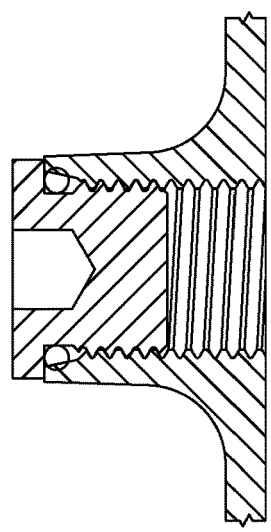
FIG. 1 depicts a prior art plug for a threaded SAE port.
Figure 4:
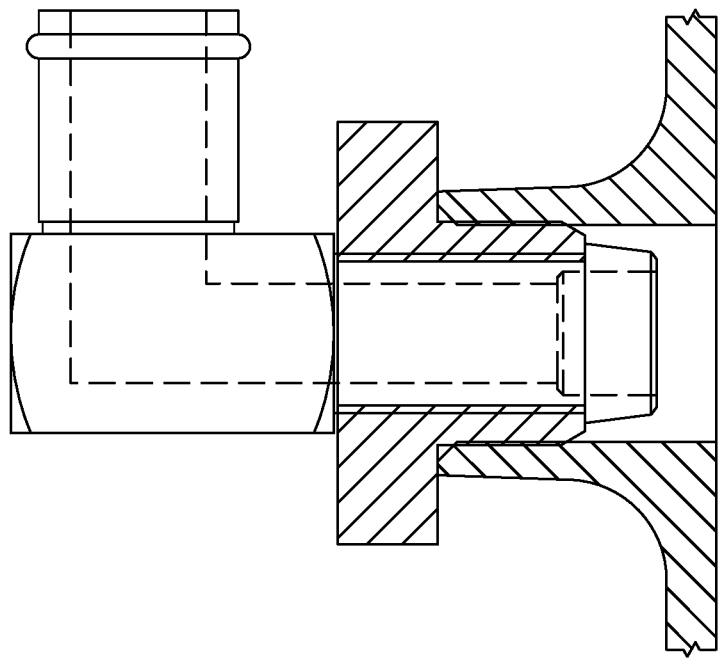
FIG. 4 depicts another prior art swivel fitting for a threaded SAE port.
Figure 5:
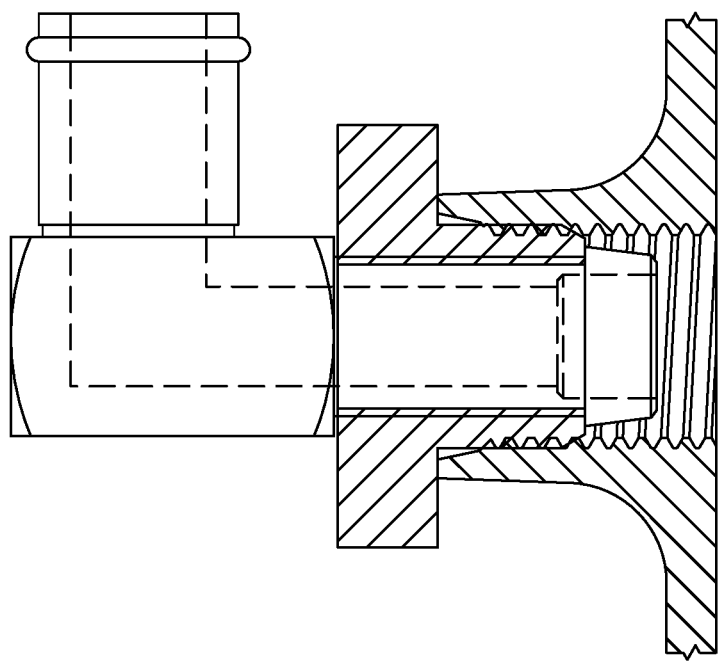
FIG. 5 depicts a prior art swivel fitting for an unthreaded port.

FIGS. 1-3 depict three examples of threaded fittings installed in threaded ports. FIG. 1 depicts a conventional plug, FIG. 2 depicts a conventional tube fitting with a jam nut, and FIG. 3 depicts a known vent fitting. FIG. 4 depicts an example of an unthreaded press-in-place fitting installed in a threaded port, while FIG. 5 depicts an example of an unthreaded press-in-place fitting installed in an unthreaded port.

Of the prior art depicted, the fitting assembly of FIG. 4 is the most similar to the disclosed invention. Both of these assemblies include a smooth (unthreaded) adaptor with a barbed fitting inserted into the adaptor. Insertion of the barbed fitting in both instances causes the adaptor to grip the port thread. In the assembly shown in FIG. 4, this gripping of the port thread does not provide a positive seal since the elastomeric material of the adaptor does not penetrate to the major diameter of the thread when the adaptor material is squeezed between the barbed fitting and the threaded port. Also, there is no mechanism holding the fitting firmly in place against the port or the casing in which the port is formed, so fluid can pass along a gap between the thread and the adaptor and out between the adaptor flange and casing, resulting in a leak.

Figure 6:
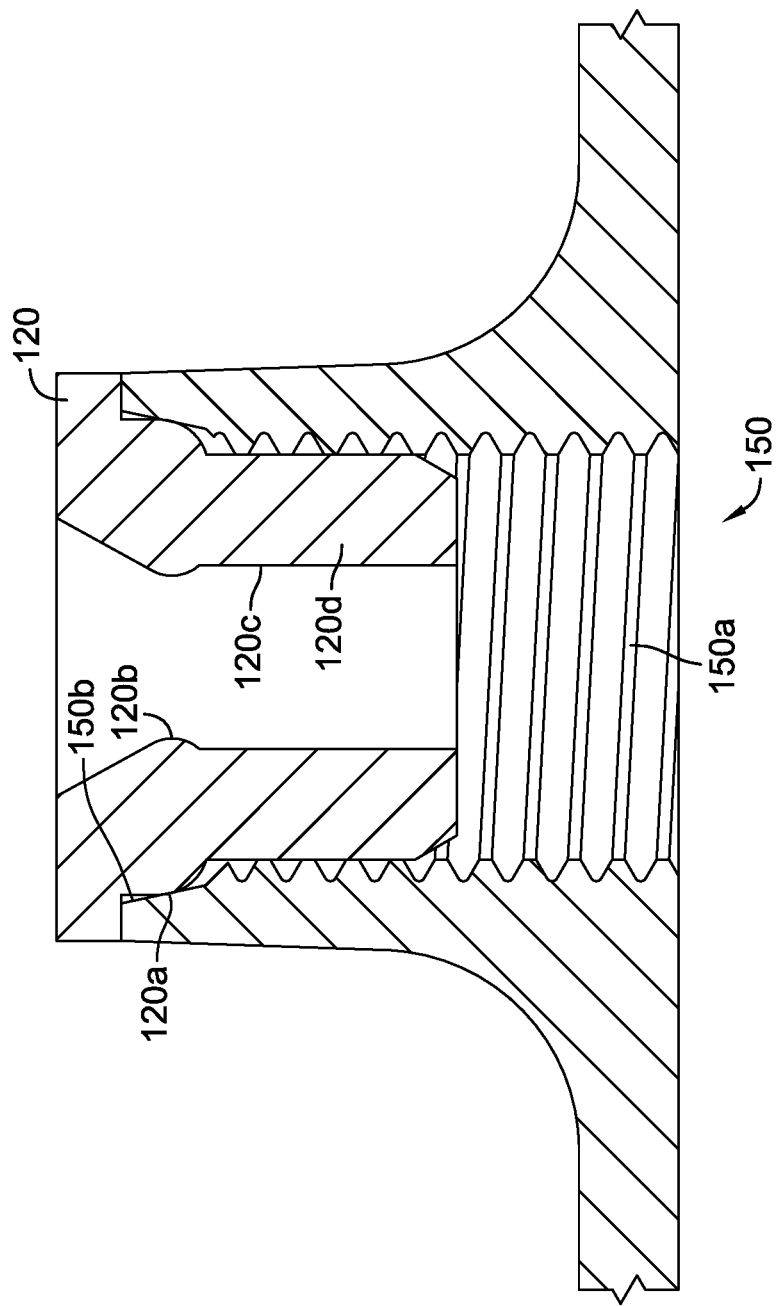
FIG. 6 is a cross-sectional view of a swivel fitting adaptor as disclosed herein.
Figure 7:
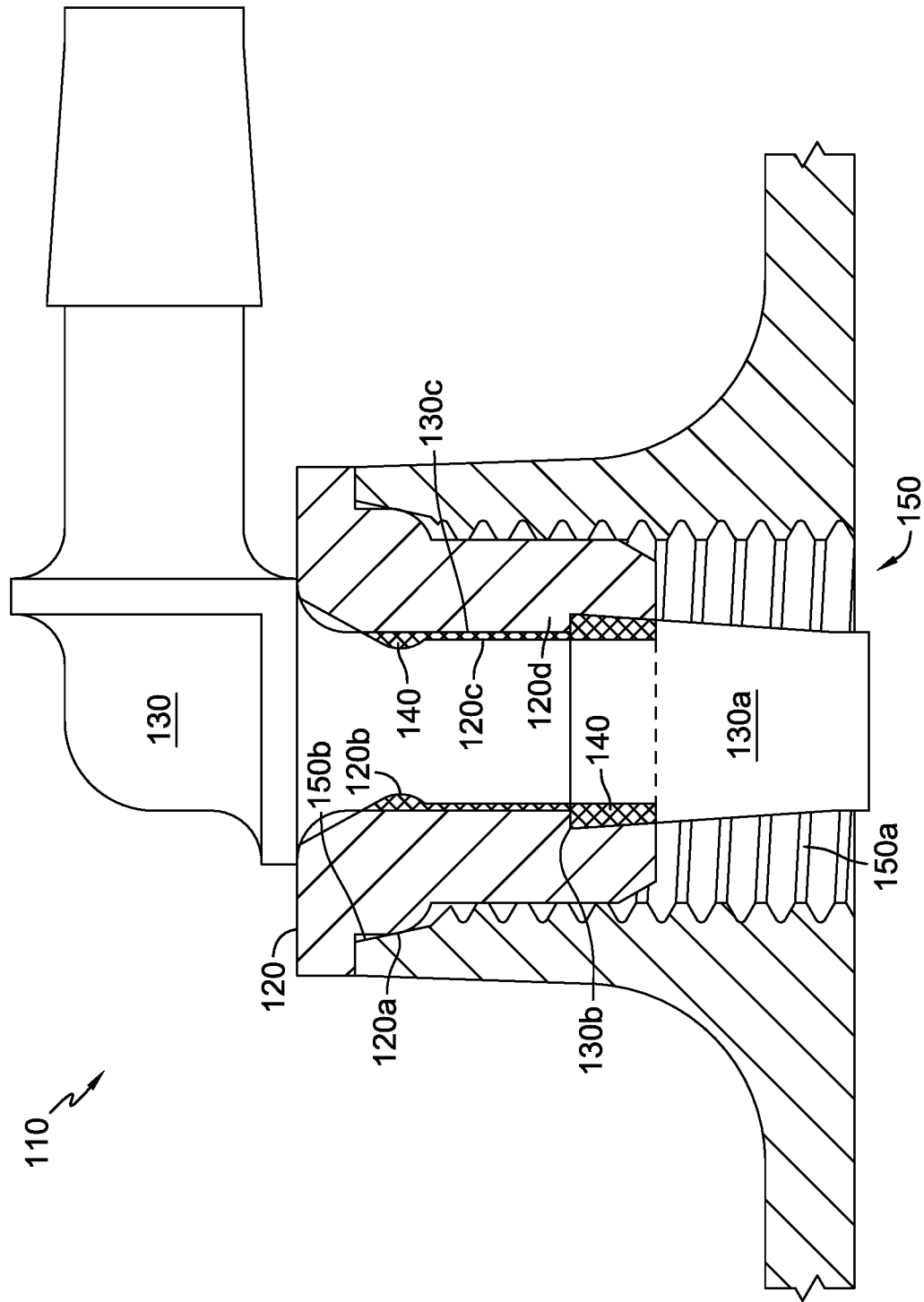
FIG. 7 is a cross-sectional view of a swivel fitting assembly as disclosed herein and comprising the swivel fitting adaptor of FIG. 6, illustrating the interference fit of the swivel fitting adaptor with an exemplary tube fitting.
Figure 8:
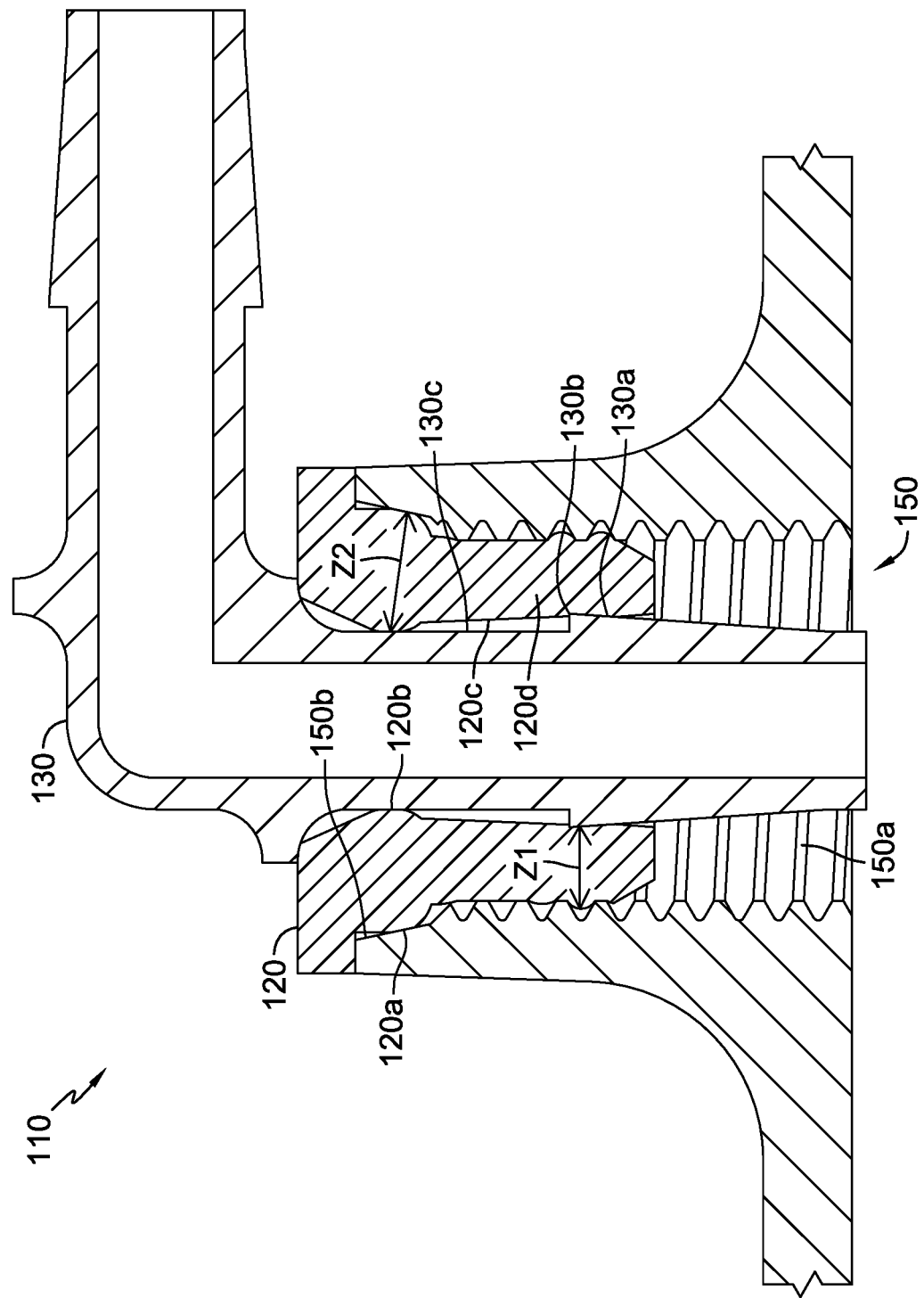
FIG. 8 is a cross-sectional view of the assembled swivel fitting of FIG. 7 illustrating deflection of the swivel fitting adaptor.

A remedy for this deficiency is illustrated in FIGS. 6-8 in the form of a swivel fitting assembly 110, shown in its installed configuration in FIG. 8. A specialized elastomeric grommet or adaptor 120 is shown installed in a threaded port 150 in FIG. 6. A transition fit (either slight interference fit or slight clearance fit) allows the adaptor 120 to be easily pushed or slipped into place in threaded port 150. As illustrated in FIG. 7, there is a material interference fit 140 (shown as a crosshatched area) between barbed fitting 130 and an opening 120c formed through the adaptor 120. Two zones of radial compression Z1 and Z2 cooperate to positively seal the adaptor 120 in threaded port 150 and retain the barbed fitting 130 in opening 120c of adaptor 120. It will be understood that, for the sake of clarity, fitting 130 is not cross-sectioned in FIG. 7, as such cross-sectioning would not aid in understanding of the disclosure.

Radial compression zone Z1 occurs in a threaded region identified as a thread 150a of the threaded port 150. When barbed fitting 130 is inserted into opening 120c, a conical barb 130a of the barbed fitting 130 pushes adaptor wall 120d outward, thereby squeezing the elastomeric material of adaptor 120 into engagement with the thread 150a of the threaded port 150. The conical barb 130a does not pass all the way through opening 120c (whereas the conical barb of the fitting shown in FIG. 4 does pass all the way through an adaptor opening). This squeezing of elastomeric material into engagement with the thread 150a, along with the typically sharp rim 130b formed at the base of the conical barb 130a, ensures a tight joint in radial compression zone Z1 that resists pullout of either the fitting or the adaptor from the threaded port 150.

Radial compression zone Z2 occurs nearer the outer end of the adaptor 120 in the area of port chamfer 150b. Adaptor 120 includes an outer ring protuberance or simulated O-ring 120a and an inner ring protuberance 120b. When the barbed fitting is installed, the stem 130c of the barbed fitting 130 bears against the inner ring protuberance 120b, thereby increasing local compression of the elastomer. The outer ring protuberance 120a mimics an O-ring that is common on, for example, SAE J514 fittings. When pressure is applied to the inner ring protuberance 120b, radial compression is applied to the simulated O-ring 120a, thereby creating a positive seal between the simulated O-ring 120a and the port chamfer 150b.

Radial compression zone Z1 is a higher compression zone for retention as compared to radial compression zone Z2 which requires less compression for the simulated O-ring seal. Once installed, the barbed fitting 130 can be swiveled to align while remaining sealed and resisting pullout.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A fitting assembly for allowing fluid passage or venting, the fitting assembly comprising;
    a port comprising a port passage extending from a first opening to a second opening, and a thread formed on at least a portion of the port passage;
    an unthreaded elastomeric adaptor capable of being inserted into the port passage, the elastomeric adaptor comprising an inner surface forming an adaptor passage, a first ring protuberance formed on a portion of the inner surface, an outer surface, and a second ring protuberance formed on a portion of the outer surface; and
    an unthreaded fitting capable of being inserted through the adaptor passage, the fitting comprising a stem and a conical barb formed on the stem, wherein when the fitting is inserted through the adaptor passage, the conical barb exerts pressure against the elastomeric adaptor to engage the elastomeric adaptor to the thread in a first radial compression zone and the stem exerts pressure against the first ring protuberance to force the second ring protuberance into sealing contact with the port adjacent the first opening, in a second radial compression zone.

2. The fitting assembly of claim 1, wherein the conical barb comprises a sharp rim to exert pressure against the elastomeric adaptor.

3. The fitting assembly of claim 1, wherein the elastomeric adaptor at least partially occupies the thread along the first radial compression zone.

4. The fitting assembly of claim 3, wherein the first radial compression zone has a first pressure that is greater than a second pressure in the second radial compression zone.

5. The fitting assembly of claim 1, wherein the elastomeric adaptor has a transition fit with the port before the fitting is inserted into the elastomeric adaptor.

6. The fitting assembly of claim 5, wherein the elastomeric adaptor has an interference fit with the port and the fitting after the fitting is inserted into the elastomeric adaptor.

7. The fitting assembly of claim 6, wherein the first radial compression zone has a first pressure that is greater than a second pressure in the second radial compression zone.

8. The fitting assembly of claim 7, wherein the elastomeric adaptor at least partially occupies a portion of the thread along the first radial compression zone.

9. The fitting assembly of claim 1, wherein the port further comprises a chamfer formed adjacent the first opening, and the stem exerts pressure against the first ring protuberance to force the second ring protuberance into sealing contact with the port adjacent the chamfer, in the second radial compression zone.

10. The fitting assembly of claim 9, wherein the elastomeric adaptor at least partially occupies the thread along the first radial compression zone, and the first radial compression zone has a first pressure that is greater than a second pressure in the second radial compression zone.

11. A fitting assembly for use with a threaded port having an opening and a thread, the fitting assembly comprising:
    an elastomeric adaptor for insertion into the threaded port, the elastomeric adaptor comprising:
        a first end and a second end, wherein, when the elastomeric adaptor is inserted into the threaded port, the first end is external to the threaded port and the second end is internal to the threaded port;
        an external wall having an external smooth surface and configured to interferingly engage with the thread, and an outer ring protuberance formed on a portion of the external wall and configured to engage with the opening of the threaded port;
        an internal passage extending from the first end to the second end of the elastomeric adaptor;
        an inner ring protuberance formed on a first portion of the internal passage, opposite the outer ring protuberance, wherein the inner ring protuberance and the outer ring protuberance are located closer to the first end than to the second end of the elastomeric adaptor; and a second portion of the internal passage defining an internal cylindrical surface extending from the inner ring protuberance to the second end of the elastomeric adaptor; and a fitting configured to be inserted into the internal passage of the elastomeric adaptor and further comprising:

a stem configured to interferingly engage with the inner ring protuberance; and a barb extending from the stem and configured to interferingly engage with the second portion of the internal cylindrical surface and compress the internal cylindrical surface when the fitting is inserted into the internal passage.

12. The fitting assembly of claim 11, wherein the barb is configured to interferingly engage with the second portion to produce a first radial compression zone having a first pressure and the stem is configured to interferingly engage with the inner ring protuberance to produce a second radial compression zone having a second pressure.

13. The fitting assembly of claim 12, wherein the elastomeric adaptor is capable of at least partially occupying the thread along the first radial compression zone when the fitting is inserted into the threaded port.

14. The fitting assembly of claim 13, wherein the first pressure is greater than the second pressure.

15. The fitting assembly of claim 11, wherein the elastomeric adaptor has a transition fit with the threaded port before the fitting is inserted into the elastomeric adaptor, and the elastomeric adaptor has an interference fit with the threaded port and the fitting after the fitting is inserted into the elastomeric adaptor.

16. A fluid line connector for use with a threaded port, the fluid line connector comprising:

a fitting having a stem and a barb extending from the stem; and an elastomeric adaptor configured to be positioned about the fitting and in the threaded port, the elastomeric adaptor comprising:

an internal passage extending from a first end of the elastomeric adaptor to a second end of the elastomeric adaptor, wherein, when the elastomeric adaptor is inserted into the threaded port, the first end is external to the threaded port and the second end is internal to the threaded port;

an external wall configured to be compressed between the barb and a thread of the threaded port in a first radial compression zone; and an inner ring protuberance formed on the internal passage and an outer ring protuberance formed on the external wall, wherein the inner and outer ring protuberances are both disposed closer to the first end of the elastomeric adaptor than to the second end, and wherein the inner and outer ring protuberances are configured to be compressed between the stem and a portion of the threaded port in a second radial compression zone, and wherein the inner ring protuberance extends inwardly beyond adjacent inner surfaces of the internal passage;

wherein a first pressure in the first radial compression zone is greater than a second pressure in the second radial compression zone.

17. The fluid line connector of claim 16, wherein the external wall of the elastomeric adaptor is capable of at least partially occupying the thread along the first radial compression zone when the fitting is inserted into the threaded port.

18. The fluid line connector of claim 17, wherein the elastomeric adaptor has a transition fit with the threaded port before the fitting is inserted into the elastomeric adaptor, and an interference fit with the threaded port and the fitting after the fitting is inserted into the elastomeric adaptor.

* * * * *